United States Patent
Wu et al.

(10) Patent No.: US 12,389,927 B1
(45) Date of Patent: Aug. 19, 2025

(54) PRODUCTION METHOD FOR HIGH-QUALITY ROOM-TEMPERATURE COOKED STINKY MANDARIN FISH

(71) Applicant: Huangshan University, Huangshan (CN)

(72) Inventors: Yongxiang Wu, Huangshan (CN); Yongxiang Wang, Huangshan (CN); Wenjing Chu, Huangshan (CN); Yang Wang, Huangshan (CN); Xinsong She, Huangshan (CN)

( * ) Notice: Subject to any disclaimer, the term of this patent is extended or adjusted under 35 U.S.C. 154(b) by 0 days.

(21) Appl. No.: 19/091,162

(22) Filed: Mar. 26, 2025

Related U.S. Application Data

(63) Continuation of application No. PCT/CN2024/133082, filed on Nov. 20, 2024.

(30) Foreign Application Priority Data

Jul. 17, 2024 (CN) .......................... 202410954544.5

(51) Int. Cl.
*A23L 17/00* (2016.01)
*A23B 4/005* (2006.01)
(Continued)

(52) U.S. Cl.
CPC ............ *A23L 17/00* (2016.08); *A23B 4/0056* (2013.01); *A23B 4/0235* (2013.01); *A23B 4/20* (2013.01); *A23L 5/11* (2016.08); *A23L 5/17* (2016.08)

(58) Field of Classification Search
None
See application file for complete search history.

(56) References Cited

U.S. PATENT DOCUMENTS

| | | | |
|---|---|---|---|
| 2018/0049445 A1* | 2/2018 | Nagayama | A23L 5/12 |
| 2022/0031790 A1* | 2/2022 | Takamura | A23L 33/105 |

FOREIGN PATENT DOCUMENTS

| | | |
|---|---|---|
| CN | 107279670 A | 10/2017 |
| CN | 109221975 A | 1/2019 |

(Continued)

OTHER PUBLICATIONS

National Health and Family Planning Commission, "National Food Safety Standard—Determination of Moisture in Food", "National Standard of the People's Republic of China", Aug. 31, 2016, 8 pages, GB 5009.3-2016.

(Continued)

*Primary Examiner* — Erik Kashnikow
*Assistant Examiner* — Ariel M Rodgers

(57) ABSTRACT

A production method for room-temperature cooked stinky mandarin fish is provided, including processing processes of marinated stinky mandarin fish, such as thawing, cleaning and dicing, soaking antimicrobic, de-fishy and freshness-preserving, low-temperature air drying, frying for shaping, and sterilizing, thereby obtaining the room-temperature cooked stinky mandarin fish product. The method combines soaking antimicrobic with mild heat treatment, which has a good microbial killing effect, and prolongs shelf-life of the cooked stinky mandarin fish, which can be stored at room-temperature for 9 months, and processing quality is significantly improved. The method innovates de-fishy and freshness-preserving preparation and process, a moisture content and water holding capacity of the product increased by 9.32% and 17.84%, respectively. The safety quality of the cooked stinky mandarin fish during storage process is improved, such as a content of TBA in fifth month under a storage condition of 30° C. is significantly reduced by 43.39%.

7 Claims, 2 Drawing Sheets

(51) Int. Cl.
*A23B 4/023* (2006.01)
*A23B 4/20* (2006.01)
*A23L 5/10* (2016.01)

(56) References Cited

FOREIGN PATENT DOCUMENTS

| | | | |
|---|---|---|---|
| CN | 109221977 A | 1/2019 | |
| CN | 110613102 A | 12/2019 | |
| CN | 111743106 A | 10/2020 | |
| CN | 113017027 A | * 6/2021 | ............... A23B 4/06 |

OTHER PUBLICATIONS

State Food and Drug Administration, "Microbiological examination of food—Determination of total bacterial count", "National Standard of the People's Republic of China", Dec. 23, 2016, 3 pages, GB 4789.2-2016.
State Food and Drug Administration, "Microbiological examination of food-Count of coliforms", "National Standard of the People's Republic of China", Dec. 23, 2016, 11 pages, GB 4789.3-2016.
International Search Authority (CNIPA), Written opinion for PCT/CN2024/133082, Jan. 25, 2025.
Claims of PCT/CN2024/133082.

* cited by examiner

PRODUCTION METHOD FOR HIGH-QUALITY ROOM-TEMPERATURE COOKED STINKY MANDARIN FISH

CROSS-REFERENCE TO RELATED APPLICATIONS

This application is a continuation of International Patent Application No. PCT/CN2024/133082, filed Nov. 20, 2024, which claims the priority of Chinese Patent Application No. 202410954544.5, filed Jul. 17, 2024, both of which are herein incorporated by reference in their entirety.

TECHNICAL FIELD

The disclosure relates to the field of food processing technologies, and more particularly to a production method for high-quality room-temperature cooked stinky mandarin fish.

BACKGROUND

"At first whiff, it has a peculiar odor, but upon closer sniffing, it reveals a surprisingly rich aroma, the flesh is as white and tender as garlic cloves, smooth and slippery when eaten, and it stimulates the saliva glands while releasing a pleasant fragrance" describes the characteristic fermented food in Huangshan area of China-Huangshan stinky mandarin fish. The stinky mandarin fish is made from fresh mandarin fish, supplemented with salt, spices and other auxiliary materials, and is fermented at low temperature and for a short period of time. Since its rich nutrition and unique flavor, it is deeply loved by people, and its market demand increases year by year. At present, the traditional processing technology of the stinky mandarin fish is to refrigerate it directly after fermentation. The main types of products are raw frozen stinky mandarin fish, which results in high storage and transportation costs, unstable quality, and short shelf-life, which can no longer meet the market supply demand.

The stinky mandarin fish is a recognized representative variety of Anhui cuisine. With the acceleration of people's pace of life, the requirements for fast, convenient and safe food are getting higher and higher, since the cooking and processing of the stinky mandarin fish are relatively complicated, and the processing technology, processing utensils, processing temperature and seasonings are relatively strict, very few families will process and cook the stinky mandarin fish by themselves. Therefore, the development of the cooked stinky mandarin fish can not only meet the needs of consumers, meet the requirements of a fast-paced life, and have great market development potential, which is particularly suitable for field work, travel, and office workers as a staple food for work meals, but also helps to improve the product chain of the traditional stinky mandarin fish industry in China. However, the key production technology and process of the cooked stinky mandarin fish are immature. At present, it is mainly adjusted according to the chef who makes it. The taste, color, texture and other characteristics of the cooked stinky mandarin fish are different, and stable and uniform quality cannot be guaranteed. At the same time, although the traditional strong heat sterilization effectively extends the shelf-life, it causes a large loss of product texture, color, and nutrition of the cooked stinky mandarin fish, which seriously affects the quality of the product. Therefore, it is necessary to develop a production method for high-quality room-temperature cooked stinky mandarin fish.

A Chinese patent application with a publication NO. CN109221975A discloses "a method for preparing instant food of stinky mandarin fish chunks", which specifically involves the processing techniques of the stinky mandarin fish chunks, such as dicing, frying, making brine, marinating, packaging, and refrigeration. The research object of this patent application is instant stinky mandarin fish chunks, which do not contain other auxiliary materials, and the product needs to be refrigerated. It does not include the technical contents of soaking antimicrobic, freshness-preserving, low-temperature air drying, dish ingredient preparation, heat treatment and mixing, and sterilization of the stinky mandarin fish, which results in the technical characteristics of cooked stinky mandarin fish production and the product flavor being significantly different.

A Chinese patent application with a publication NO. CN110613102A discloses "a method for preparing instant stinky mandarin fish tin", which specifically involves the processing techniques of the stinky mandarin fish, such as ultrasonic-assisted circulating water thawing, high-frequency vibration-assisted warm water thawing, cleaning, cutting, mixing and marinating, vacuum low-temperature treatment, soup preparation, dish ingredient preparation, packaging and sterilization. The research object of this patent application is instant stinky mandarin fish tin, not a cooked stinky mandarin fish dish for one person, and the sterilization method is strong heat treatment, thus it is different from the research and application object of the disclosure, and there is no technical contents of the stinky mandarin fish, such as de-fishy and freshness-preserving, hot oil shaping, soaking antimicrobic combined with mild heat treatment, which leads to significantly different quality and flavor of cooked stinky mandarin fish.

A Chinese patent application with a publication NO. CN109221977A discloses "a method for preparing cooked whole stinky mandarin fish", which specifically involves the processing techniques of the whole stinky mandarin fish, such as frying, braising, flavoring, packaging, and refrigeration. The research object of this patent application is the cooked whole stinky mandarin fish, which does not contain other dish ingredients, and the product needs to be refrigerated. It does not include the technical contents of the stinky mandarin fish, such as soaking antimicrobic, freshness-preserving, low-temperature air drying, low-temperature frying, dish ingredient preparation, heat treatment and mixing, and sterilization, which leads to significantly different technical characteristics and product flavor of cooked stinky mandarin fish.

SUMMARY

An objective of the disclosure is to provide a production method for high-quality room-temperature cooked stinky mandarin fish (also referred to as ready-to-eat stinky mandarin fish), thereby providing a cooked stinky mandarin fish product, which not only has a long shelf-life, but also can effectively ensure that the edible qualities of the cooked stinky mandarin fish, such as color, sensory quality, and texture characteristics are not adversely affected.

In order to achieve the above objective, the disclosure provides the following technical solutions.

A production method for high-quality room-temperature cooked stinky mandarin fish includes: preliminarily processing a marinated stinky mandarin fish, followed by soaking in an antimicrobial solution, and soaking in a de-fishy and freshness-preserving solution, to obtain a soaked product, drying the soaked product to obtain a dried product, shaping the dried product to obtain a room-temperature cooked stinky mandarin fish product.

In an embodiment, the marinated stinky mandarin fish requires no damage, air leakage or inflation in packaging, no obvious dryness or softening phenomenon, fish meat having a natural white color, and having a typical odor after fermentation. A moisture content of the marinated stinky mandarin fish is less than or equal to 80%, a chloride content of the marinated stinky mandarin fish is less than or equal to 2%, and an amino acid nitrogen content of the marinated stinky mandarin fish is greater than or equal to 600 milligrams per kilogram (mg/kg).

In an embodiment, the preliminarily processing a marinated stinky mandarin fish includes cleaning the marinated stinky mandarin fish until there are no blood stains or mucus on a surface of the marinated stinky mandarin fish to obtain a cleaned marinated stinky mandarin fish, and dicing the cleaned marinated stinky mandarin fish into fish pieces each with a length and a width of 1.5 centimeters (cm) to 2.5 cm.

In an embodiment, the antimicrobial solution is chlorine containing electrolyzed water. A power of hydrogen (pH) of the chlorine containing electrolyzed water is in a range of 6.5 to 7.5, an effective chlorine content of the chlorine containing electrolyzed water is in a range of 0.03 milligrams per milliliter (mg/mL) to 0.15 mg/mL, and a time of the soaking in an antimicrobial solution is in a range of 2 minutes (min) to 10 min.

In an embodiment, the de-fishy and freshness-preserving solution includes a plant composition, food-grade sodium lactate, food-grade cysteine, food-grade compound phosphate and water. Every 1 kilogram (kg) of the de-fishy and freshness-preserving solution includes 5 grams (g) to 12 g of the plant composition, 0.001 g to 0.01 g of the food-grade sodium lactate, 0.001 g to 0.01 g of the food-grade cysteine, and 0.01 g to 1 g of the food-grade compound phosphate with a remainder being the water. A time of the soaking in a de-fishy and freshness-preserving solution is in a range of 5 min to 15 min.

In an embodiment, a preparation method of the plant composition includes: taking 5-15 parts by weight of dried perilla powder, 10-20 parts by weight of dried onion powder, 5-10 parts by weight of dried *Lithospermum erythrorhizon* powder, 5-10 parts by weight of dried *Angelica sinensis* powder and 125-300 parts by weight of distilled water as raw materials, stirring the raw materials to mix evenly to obtain a mixture, extracting from the mixture under conditions of a negative pressure intensity of −0.02 megapascals (MPa) to −0.08 MPa, a stirring speed of 100 revolutions per minute (rpm) to 150 rpm, a temperature of 30 Celsius degrees (° C.) to 55° C., and an extraction time of 0.5 hours (h) to 1 h to obtain an extracted solution, filtering and merging the extracted solution, followed by freeze-drying, to obtain the plant composition.

In an embodiment, the drying the soaked product to obtain a dried product includes low-temperature air drying in an oven, with a temperature controlled between 45° C. to 65° C., and a time controlled between 1 h to 4 h. At this time, the fish pieces are slightly dry and hard.

In an embodiment, the shaping the dried product to obtain a room-temperature cooked stinky mandarin fish product includes: frying the dried product in a vacuum fryer with a temperature of 60° C. to 85° C., a time of 30 seconds(s) to 120 s, and a vacuum degree of 60 kilopascals (kPa) to 85 kPa, to obtain a fried product, and taking out the fried product until the skin of the fish pieces is slightly hardened and draining oil from the fried product. The oil in the vacuum fryer is edible vegetable oil.

In an embodiment, the shaping the dried product to obtain a room-temperature cooked stinky mandarin fish product further includes mixing and heating the room-temperature cooked stinky mandarin fish product and dish ingredients to obtain a cooked stinky mandarin fish dish.

In an embodiment, the dish ingredients include: 30-50 parts by weight of dried bamboo shoots, 5-15 parts by weight of bell pepper, 5-15 parts by weight of onion, 5-15 parts by weight of fat meat, 5-10 parts by weight of mushroom, 2-5 parts by weight of black bean sauce, 2-3 parts by weight of oyster sauce, 1-2 parts by weight of soy sauce, 1-2 parts by weight of white sugar, 0.5-1 parts by weight of chicken essence, 0.3-1 parts by weight of vinegar, and 0.2-0.5 parts by weight of hydroxypropyl distarch phosphate. Chunks in the dish ingredients are diced into pieces with a particle size of 0.5 cm to 1.5 cm.

In an embodiment, the mixing and heating the room-temperature cooked stinky mandarin fish product and dish ingredients to obtain a cooked stinky mandarin fish dish includes pre-heating the dish ingredients to raise a temperature to 70° C. to 90° C. for 3 min to 5 min to obtain pre-heated dish ingredients, stopping heating, adding the room-temperature cooked stinky mandarin fish product, and mixing the pre-heated dish ingredients and the room-temperature cooked stinky mandarin fish product evenly.

In an embodiment, the subpackaging the room-temperature cooked stinky mandarin fish product to obtain subpackaged products includes cooling the room-temperature cooked stinky mandarin fish product to obtain a cooled product, and subpackaging the cooled product into vacuum bags, followed by vacuum sealing.

In an embodiment, the sterilizing the subpackaged products includes: placing the subpackaged products in a high-temperature high-pressure sterilization kettle for sterilization with a temperature of 85° C. to 105° C., a time of 5 min to 15 min, and a pressure of 0.2 MPa.

Compared to the related art, the beneficial effects of the disclosure are as follows.

The disclosure adopts a method of combining the soaking antimicrobic with the mild heat treatment, which has a good microbial killing effect, thereby ensuring the food safety, prolonging the shelf-life, and largely avoiding adverse effects on the color, sensory quality, and texture characteristics of the cooked stinky mandarin fish. For example, a volume shrinkage ratio of the cooked stinky mandarin fish is reduced by 14.73%, an elasticity is increased by 80.24%, which significantly improves the processing quality of the cooked stinky mandarin fish.

The disclosure innovates the de-fishy and freshness-preserving preparation and process in the processing process, which can not only remove the fishy smell of the stinky mandarin fish, but also significantly reduce the water loss rate of the stinky mandarin fish in the processing process, such as a moisture content and water holding capacity of the product increased by 9.32% and 17.84%, respectively, and the generation of thiobarbituric acid (TBA) reactants in the storage process of the cooked stinky mandarin fish is also effectively inhibited, such as the content of the TBA in the fifth month under the storage condition of 30° C. is significantly reduced by 43.39%, and the added de-fishy and freshness-preserving ingredients have multiple functions such as de-fishy, fresh-preserving and anti-oxidation, thereby improving the safety quality of the cooked stinky mandarin fish in the storage process.

The low-temperature air drying process adopted by the disclosure can effectively control the moisture content of the fish meat and ensure the taste and edible quality of the final product.

The shaping process of the disclosure not only ensures the edible quality of the fish meat itself, but also ensures the integrity of the fish meat in subsequent processing.

The cooked stinky mandarin fish prepared by the disclosure has uniform quality, rich nutrition and full flavor. Compared with freshly cooked stinky mandarin fish dishes, there is no significant difference in color, fish meat texture, elasticity and garlic clove shape. It can be eaten after being heated in a microwave oven for 5 min or in a hot water bath for 5 min to 10 min. It is convenient and fast, and can be stored at the room-temperature for 9 months, and has broad market application prospects. At the same time, the disclosure enriches the types of the stinky mandarin fish pre-prepared dishes, and meets the pursuit of modern people, especially people with fast-paced life, for safe, delicious, nutritious and convenient cooked stinky mandarin fish.

DETAILED DESCRIPTION OF EMBODIMENTS

Figure 1:
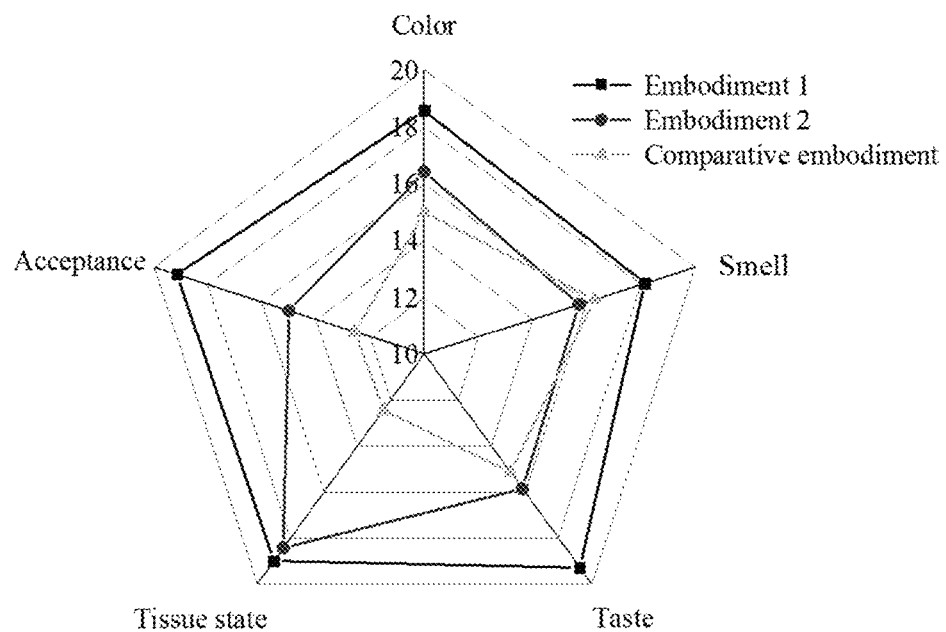
FIG. 1 illustrates a schematic diagram of a sensory evaluation result of cooked stinky mandarin fish of the disclosure.

The disclosure provides a high-quality room-temperature cooked stinky mandarin fish and a production method thereof. In an exemplary embodiment, the exemplary production method includes the follows.

1. Raw material acceptance: authentic Huizhou stinky mandarin fish is selected, the packaging of the stinky mandarin fish should not be damaged, leaking or bloated, the stinky mandarin fish should be no obvious drying and softening, the fish meat should have the natural white color of the product, and have the typical odor after fermentation, and its moisture content is ≤80%, a chloride content is ≤2%, and an amino acid nitrogen content is ≥600 mg/kg. After the raw materials meet the requirements, they should be stored below −18° C. for standby use.

2. Thawing: the stinky mandarin fish is taken out from a cold storage and placed in a thawing pool for thawing. The thawing can adopt air thawing or running water thawing. During thawing, a center temperature of the stinky mandarin fish is controlled at 5° C. to 8° C. In the air thawing, the ambient temperature is controlled at 12° C. to 18° C., and a thawing time is controlled within 10 h to 16 h. In the running water thawing, the temperature of the water is controlled at 15° C. to 20° C., and a thawing time is controlled within 6 h to 10 h.

3. Cleaning and dicing: the thawed stinky mandarin fish is cleaned with flowing water until there is no blood stains and mucus on the surface of the stinky mandarin fish. The cleaned stinky mandarin fish is diced into fish pieces with a length and a width of 1.5 cm to 2.5 cm.

4. Soaking antimicrobic: the fish pieces are placed in electrolyzed water for soaking antimicrobic, and then are taken out and drained. A pH of the electrolyzed water is in a range of 6.5 to 7.5, an effective chlorine content of the electrolyzed water is in a range of 0.03 mg/mL to 0.15 mg/mL, and a time of the soaking is in a range of 2 min to 10 min.

5. De-fishy and freshness-preserving: the fish pieces after soaking antimicrobic in the step 4 is soaked in a de-fishy and freshness-preserving solution for 5 min to 15 min, followed by stirring and draining. The de-fishy and freshness-preserving solution is prepared by the following raw materials: a plant composition, food-grade sodium lactate, food-grade cysteine, food-grade compound phosphate and water. Every 1 kg of the de-fishy and freshness-preserving solution includes 5 g to 12 g of the plant composition, 0.001 g to 0.01 g of the food-grade sodium lactate, 0.001 g to 0.01 g of the food-grade cysteine, 0.01 g to 1 g of the food-grade compound phosphate with a remainder being water. A preparation method of the plant composition includes: 5-15 parts by weight of dried perilla powder, 10-20 parts by weight of dried onion powder, 5-10 parts by weight of dried *Lithospermum erythrorhizon* powder, 5-10 parts by weight of dried *Angelica sinensis* powder and 125-300 parts by weight of distilled water are taken out and stirred to mix evenly to obtain a mixture. The mixture is extracted under conditions of a negative pressure intensity of −0.02 MPa to −0.08 MPa, a stirring speed of 100 rpm to 150 rpm, a temperature of 30° C. to 55° C., and an extraction time of 0.5 h to 1 h to obtain an extracted solution. The extracted solution is filtered and merged, followed by freeze-drying, to obtain the plant composition.

6. Low-temperature air drying: the fish pieces after soaking in the de-fishy and freshness-preserving solution in the step 5 are placed in an oven for low-temperature air drying with a temperature of 45° C. to 65° C. and a time of 1 h to 4 h. At this time, the fish pieces become slightly dry and hard.

7. Shaping: the low-temperature air dried fish pieces in the step 6 are fried in a vacuum oil fryer with a temperature of 60° C. to 85° C., a time of 30 s to 120 s, and a vacuum degree of 60 kPa to 85 kPa, until the skin of the fish pieces is slightly hardened, then the fish pieces are taken out from the vacuum oil fryer and drain the oil. The oil in the vacuum oil fryer is edible vegetable oil.

8. Dish ingredient preparation: a raw composition of the dish ingredients includes: 30-50 parts by weight of dried bamboo shoots, 5-15 parts by weight of bell pepper, 5-15 parts by weight of onion, 5-15 parts by weight of fat meat, 5-10 parts by weight of mushroom, 2-5 parts by weight of black bean sauce, 2-3 parts by weight of oyster sauce, 1-2 parts by weight of soy sauce, 1-2 parts by weight of white sugar, 0.5-1 parts by weight of chicken essence, 0.3-1 parts by weight of vinegar, and 0.2-0.5 parts by weight of hydroxypropyl distarch phosphate. According to the raw material preparation of the dish ingredients, the raw materials such as the dried bamboo shoots, the bell pepper, the onion, the fat meat, and the mushroom are cleaned and diced to small pieces with a particle size of 0.5 cm to 1.5 cm.

9. Heat treatment and materials mixing: the dish ingredients such as the fat meat, the dried bamboo shoots, the bell pepper, the onion, and the mushroom are pre-heated with the temperature being raised to 70° C. to 90° C. for 3 min to 5 min. After stopping heating, the fish pieces prepared in the step 7 are added, and the fish pieces and the pre-heated dish ingredients are mixed evenly to obtain the cooked stinky mandarin fish product. The conditions for the pre-heated include: a heating temperature of 50° C. to 60° C., and a heating time of 5 min to 15 min. An addition ratio of the fish pieces and the dish ingredients is 1:2 to 1:3.

10. Subpackaging and inner packaging: after the product in the step 9 is cooled, the product is weighed and subpackaged into aluminum foil bags with 160 g per bag, and then vacuum-sealed.

11. Sterilization: the products after vacuum-sealed in the step 10 are sterilized in a high-temperature high-pressure sterilization kettle with a temperature of 85° C. to 105° C., a time of 5 min to 15 min, and a pressure of 0.2 MPa.

12. Storage: the sterilized stinky mandarin fish products in the step 11 are stored in the room-temperature.

The technical solutions in the embodiments of the disclosure will be described clearly and completely in conjunction with the embodiments and drawings of the disclosure below. Apparently, the described embodiments are merely some of the embodiments of the disclosure, not all of them. Based on the embodiments of the disclosure, all other embodiments obtained by those skilled in the art without creative work are within the scope of protection of the disclosure.

The specific implementation of the disclosure is further described in detail below in conjunction with specific embodiments.

The following reagents and materials, unless otherwise specified, are purchased from the market. Chlorine-containing electrolyzed water is commercially purchased food-grade sodium hypochlorite (Guangzhou Jiupin Environmental Protection Technology Co., Ltd.) and prepared with deionized water to the required specifications. Food-grade sodium lactate, food-grade cysteine, and food-grade composite phosphate are purchased from Xuzhou Tianan Food Additive Co., Ltd. The food-grade composite phosphate ingredients included: 24% sodium tripolyphosphate, 21% sodium pyrophosphate, 14% sodium hexametaphosphate, and 4% trisodium phosphate.

Embodiment 1

A product of the embodiment 1 is prepared according to the steps of the production method of the high-quality room-temperature cooked stinky mandarin fish disclosed by the disclosure.

1. Raw material acceptance: authentic Huizhou stinky mandarin fish is selected, the packaging of the stinky mandarin fish should not be damaged, leaking or bloated, the stinky mandarin fish should be no obvious drying and softening, the fish meat should have the natural white color of the product, and have the typical odor after fermentation, and its moisture content is ≤80%, a chloride content is ≤2%, and an amino acid nitrogen content is ≥600 mg/kg. After the raw materials meet the requirements, they should be stored below −18° C. for standby use.

2. Thawing: the stinky mandarin fish is taken out from a cold storage and placed in a thawing pool for thawing. The air thawing is adopted, the ambient temperature is controlled at 16° C., and a thawing time is 12 h. During thawing, a center temperature of the stinky mandarin fish does not exceed 7° C.

3. Cleaning and dicing: the thawed stinky mandarin fish is cleaned with flowing water until there is no blood stains and mucus on the surface of the stinky mandarin fish. The cleaned stinky mandarin fish is diced into fish pieces with a length and a width of 2.0 cm to 2.5 cm.

4. Soaking antimicrobic: the fish pieces are placed in electrolyzed water for soaking antimicrobic, and then are taken out and drained. A pH of the electrolyzed water is 7.0, an effective chlorine content of the electrolyzed water is 0.08 mg/mL, and a time of the soaking is 5 min.

5. De-fishy and freshness-preserving: the fish pieces after soaking antimicrobic in the step 4 is soaked in a de-fishy and freshness-preserving solution for 10 min, followed by stirring and draining. The de-fishy and freshness-preserving solution is prepared by the following raw materials: a plant composition, food-grade sodium lactate, food-grade cysteine, food-grade compound phosphate and water. Every 1 kg of the de-fishy and freshness-preserving solution includes 6 g of the plant composition, 0.01 g of the food-grade sodium lactate, 0.01 g of the food-grade cysteine, 0.05 g of the food-grade compound phosphate with a remainder being water. A preparation method of the plant composition includes: 10 parts by weight of dried perilla powder, 10 parts by weight of dried onion powder, 5 parts by weight of dried *Lithospermum erythrorhizon* powder, 5 parts by weight of dried *Angelica sinensis* powder and 300 parts by weight of distilled water are taken out and stirred to mix evenly to obtain a mixture. The mixture is extracted under conditions of a negative pressure intensity of −0.05 MPa, a stirring speed of 150 rpm, a temperature of 50° C., and an extraction time of 1 h to obtain an extracted solution. The extracted solution is filtered and merged, followed by freeze-drying, to obtain the plant composition.

6. Low-temperature air drying: the fish pieces after soaking in the de-fishy and freshness-preserving solution in the step 5 are placed in an oven for low-temperature air drying with a temperature of 55° C. and a time of 2.5 h. At this time, the fish pieces become slightly dry and hard.

7. Shaping: the low-temperature air dried fish pieces in the step 6 are fried in a vacuum oil fryer with a temperature of 75° C., a time of 60 s, and a vacuum degree of 70 kPa, until the skin of the fish pieces is slightly hardened, then the fish pieces are taken out from the vacuum oil fryer and drain the oil. The oil in the vacuum oil fryer is edible vegetable oil.

8. Dish ingredient preparation: a raw composition of the dish ingredients includes: 45 parts by weight of dried bamboo shoots, 10 parts by weight of bell pepper, 12 parts by weight of onion, 15 parts by weight of fat meat, 8 parts by weight of mushroom, 4 parts by weight of black bean sauce, 2.5 parts by weight of oyster sauce, 1.5 parts by weight of soy sauce, 1 parts by weight of white sugar, 0.5 parts by weight of chicken essence, 0.3 parts by weight of vinegar, and 0.2 parts by weight of hydroxypropyl distarch phosphate. According to the raw material preparation of the dish ingredients, the raw materials such as the dried bamboo shoots, the bell pepper, the onion, the fat meat, and the mushroom are cleaned and diced to small pieces with a particle size of 1.0 cm to 1.5 cm.

9. Heat treatment and materials mixing: the dish ingredients such as the fat meat, the dried bamboo shoots, the bell pepper, the onion, and the mushroom are pre-heated with the temperature being raised to 85° C. for 5 min. After stopping heating, the fish pieces prepared in the step 7 are added, and the fish pieces and the pre-heated dish ingredients are mixed evenly to obtain the cooked stinky mandarin fish products. The conditions for the pre-heated include: a heating temperature of 50° C., and a heating time of 7 min. An addition ratio of the fish pieces and the dish ingredients is 1:2.

10. Subpackaging and inner packaging: after the product in the step 9 is cooled, the product is weighed and subpackaged into aluminum foil bags with 160 g per bag, and then vacuum-sealed.

11. Sterilization: the products after vacuum-sealed in the step 10 are sterilized in a high-temperature high-pressure sterilization kettle with a temperature of 95° C., a time of 15 min, and a pressure of 0.2 MPa.

12. Storage: the sterilized stinky mandarin fish products in the step 11 are stored in the room-temperature.

Embodiment 2

A product of the embodiment 2 is prepared according to the steps of the production method of the high-quality room-temperature cooked stinky mandarin fish disclosed by the disclosure.

1. Raw material acceptance: authentic Huizhou stinky mandarin fish is selected, the packaging of the stinky mandarin fish should not be damaged, leaking or bloated, the stinky mandarin fish should be no obvious drying and softening, the fish meat should have the natural white color of the product, and have the typical odor after fermentation, and its moisture content is ≤80%, a chloride content is ≤2%, and an amino acid nitrogen content is ≥600 mg/kg. After the raw materials meet the requirements, they should be stored below −18° C. for standby use.

2. Thawing: the stinky mandarin fish is taken out from a cold storage and placed in a thawing pool for thawing. The air thawing is adopted, the ambient temperature is controlled at 16° C., and a thawing time is 12 h. During thawing, a center temperature of the stinky mandarin fish does not exceed 7° C.

3. Cleaning and dicing: the thawed stinky mandarin fish is cleaned with flowing water until there is no blood stains and mucus on the surface of the stinky mandarin fish. The cleaned stinky mandarin fish is diced into fish pieces with a length and a width of 2.0 cm to 2.5 cm.

4. Low-temperature air drying: the diced fish pieces are placed in an oven for low-temperature air drying with a temperature of 55° C. and a time of 2.5 h. At this time, the fish pieces become slightly dry and hard.

5. Shaping: the low-temperature air dried fish pieces in the step 4 are fried in a vacuum oil fryer with a temperature of 75° C., a time of 60 s, and a vacuum degree of 70 kPa, until the skin of the fish pieces is slightly hardened, then the fish pieces are taken out from the vacuum oil fryer and drain the oil. The oil in the vacuum oil fryer is edible vegetable oil.

6. Dish ingredient preparation: a raw composition of the dish ingredients includes: 45 parts by weight of dried bamboo shoots, 10 parts by weight of bell pepper, 12 parts by weight of onion, 15 parts by weight of fat meat, 8 parts by weight of mushroom, 4 parts by weight of black bean sauce, 2.5 parts by weight of oyster sauce, 1.5 parts by weight of soy sauce, 1 parts by weight of white sugar, 0.5 parts by weight of chicken essence, 0.3 parts by weight of vinegar, and 0.2 parts by weight of hydroxypropyl distarch phosphate. According to the raw material preparation of the dish ingredients, the raw materials such as the dried bamboo shoots, the bell pepper, the onion, the fat meat, and the mushroom are cleaned and diced to small pieces with a particle size of 1.0 cm to 1.5 cm.

7. Heat treatment and materials mixing: the dish ingredients such as the fat meat, the dried bamboo shoots, the bell pepper, the onion, and the mushroom are pre-heated with the temperature being raised to 85° C. for 5 min. After stopping heating, the fish pieces prepared in the step 5 are added, and the fish pieces and the pre-heated dish ingredients are mixed evenly to obtain the cooked stinky mandarin fish products. The conditions for the pre-heated include: a heating temperature of 50° C., and a heating time of 7 min. An addition ratio of the fish pieces and the dish ingredients is 1:2.

8. Subpackaging and inner packaging: after the product in the step 7 is cooled, the product is weighed and subpackaged into aluminum foil bags with 160 g per bag, and then vacuum-sealed.

9. Sterilization: the products after vacuum-sealed in the step 8 are sterilized in a high-temperature high-pressure sterilization kettle with a temperature of 95° C., a time of 15 min, and a pressure of 0.2 MPa.

10. Storage: the sterilized stinky mandarin fish products in the step 9 are stored in the room-temperature.

Embodiment 3

Comparative embodiment: a product of the comparative embodiment is prepared according to a publicly available patent application method. The patent publication number is CN110613102A, with an invention creation name of a preparation method of instant stinky mandarin fish tins.

Effect Evaluation

Sensory evaluation: a sensory evaluation team of 8 professionally trained personnel is formed. The cooked stinky mandarin fish samples from each group (i.e., the product of the embodiment 1, the product of the embodiment 12, and the product of the comparative embodiment) are selected and placed in the same container for coding, and evaluated based on five indicators including color, smell, taste, tissue state and acceptance. The evaluation criteria are shown in Table 1.

TABLE 1

| Sensory evaluation criteria of cooked stinky mandarin fish | | |
|---|---|---|
| Indicator | Quality description and scoring criteria | Score |
| Color | The inside of the fish is white in color, with a glossiness | 14-20 |
| | The inside of the fish is slightly yellow in color, with an average glossiness | 7-13 |
| | The inside of the fish is yellow in color, without glossiness | 0-6 |
| Smell | The fish has a typical odor after fermentation, without spoilage or other unpleasant odors | 14-20 |
| | The fish has a slightly strong or weak odor, without spoilage or other unpleasant odors | 7-13 |
| | The fish has a slightly strong or weak odor, with a little spoilage or other unpleasant odors | 0-6 |
| Taste | The fish has a delicate and elastic taste | 14-20 |
| | The fish has a relatively delicate, relatively compact and relatively elastic taste | 7-13 |
| | The fish has a poor, compact but inelastic taste | 0-6 |

TABLE 1-continued

Sensory evaluation criteria of cooked stinky mandarin fish

| Indicator | Quality description and scoring criteria | Score |
|---|---|---|
| Tissue state | The fish has a neat fleshy block shape, separated flesh and blood, and obvious garlic cloves. | 14-20 |
| | The fish has a relatively neat fleshy block shape, separated flesh and blood, and relatively obvious garlic cloves. | 7-13 |
| | The fish has irregular meat block shape, unseparated flesh and blood, and no garlic cloves | 0-6 |
| Acceptance | Approving | 14-20 |
| | General | 7-13 |
| | Unacceptable | 0-6 |

Determination of moisture content: referring to the national food safety standard "Standards and methods for determination of moisture in food" (GB5009.3-2016).

Determination of water holding capacity: the cooked stinky mandarin fish pieces from different groups (i.e., the product of the embodiment 1, the product of the embodiment 12, and the product of the comparative embodiment) are weighed, and placed between two layers of filter paper, a 5 kg weight is applied to them for 2 min, and them are weighed again. The water holding capacity is calculated based on the moisture that is squeezed out. The determination is repeated for 3 times and the average value is taken.

Determination of volume shrinkage ratio: 5 g of the cooked stinky mandarin fish samples from different groups (i.e., the product of the embodiment 1, the product of the embodiment 12, and the product of the comparative embodiment) are taken, and each put into a measuring cylinder to measure the volumes, determination of each sample is repeated for 3 times, the average value is taken, and the volume shrinkage ratio is calculated according to the following formula:

$$T = \frac{V}{C}$$

where T represents the volume shrinkage ratio, V represents a volume of the cooked stinky mandarin fish from each group, and C represents a volume of stinky mandarin fish after fermentation (uncooked).

Chromaticity determination: a portable colorimeter is used, three points are randomly selected from the muscles of the stinky mandarin fish in the control group (i.e., the comparative embodiment) and the embodiment groups (i.e., the embodiment 1 and the embodiment 2) for determination, and the values of L* (brightness), a* (redness), and b* (yellowness) are recorded, and their average values are calculated as follows:

$$\text{whiteness} = 100 - \overline{\sqrt{(100-L^*)^2 + a^{*2} + b^{*2}}}.$$

Determination of texture characteristics: the texture characteristics of the cooked stinky mandarin fish in different groups are determined by using a texture analyzer (e.g., an ENS-iPRO® texture analyzer) with a 36 mm flat-bottom cylindrical probe. Determination conditions include pre-determine rate of 60 millimeters per minute (mm/min), determination rate of 60 mm/min, post-determine rate of 60 mm/min, a compression degree of 30%, a distance of 1.00 millimeter (mm), trigger force of 0.03 newtons (N), and trigger type of automatic.

Determination of TBA: 10 g of the cooked smelly mandarin fish from different groups and under different storage conditions (30° C., 0-5 months) are placed in beakers, 25 milliliters (mL) of distilled water are added into each beaker, followed by homogenizing, and 25 mL of trichloroacetic acid with a concentration of 10 g/100 mL is added into each breaker to mix evenly and let stand for 30 min to obtain an even solution. The even solution is filtered to obtain supernatant. 5 mL of the supernatant is taken and added with 5 mL of 0.02 moles per liter (mol/L) TBA solution to obtain a mixed solution. The mixed solution is heated in a constant temperature water bath at 80° C. for 40 min to obtain a heated solution. The heated solution is taken out and cooled to room-temperature to obtain a cooled solution. Absorbance of the cooled solution is measured at a wavelength of 532 nanometers (nm). TBA value is expressed as the mass of malondialdehyde contained in each kilogram of fish meat, in mg/kg.

Determination of total microbial colony count: refer to GB4789.2-2016 "National Food Safety Standard Food Microbiology Inspection-Determination of Total Colony Count". The plate count method is used to determine the total microbial colony count of the cooked stinky mandarin fish in different groups at 30° C. and different storage times (0 to 5 months). The total colony count is obtained after incubation in a 35° C. to 37° C. biochemical incubator for 46 h to 50 h.

Determination of total coliform count: refer to GB4789.3-2016 "National Food Safety Standard Food Microbiology Inspection-Determination of Coliforms". The total coliform count in the cooked stinky mandarin fish in different groups and under different storage conditions (30° C., 0-5 months) is determined.

Statistics and analysis of data: the experiment is repeated three times and the results are expressed as mean±standard deviation. A drawing and data analysis software (e.g., Origin8.5® software) is used for drawing and a statistical analysis software (e.g., statistical package for the social sciences abbreviated as SPSS 18.0® software) is used for variance analysis. P<0.05 indicates a significant difference.

The cooked stinky mandarin fish prepared according to the method of the disclosure has a yellow appearance, white and shiny meat inside, has a typical odor after fermentation, no fishy smell, corruption smell and other bad smells, the fish meat is compact and elastic, the meat blocks are relatively neat, tender and smooth, and not soft. The cooked stinky mandarin fish product prepared by the disclosure has been mass-produced, and its portion is suitable for one person, and can be eaten after being heated in a microwave oven for 5 min or in a hot water bath for 5 to 10 min, which is convenient and quick, and can be stored at the room temperature for 9 months.

A sensory evaluation team is formed by 8 professionally trained personnel. The cooked stinky mandarin fish samples of each group are selected and placed in the same container for coding, and are evaluated based on five indicators, including color, smell, taste, tissue state and acceptance. The sensory evaluation results obtained according to the sensory scoring standard of cooked stinky mandarin fish in Table 1 are shown in FIG. 1. The sensory evaluation is mainly based on the comprehensive evaluation of the five indicators, including color, smell, taste, tissue state and acceptance, by the evaluation team members. Compared with the preparation method for instant stinky mandarin fish tins disclosed in the published patent application with a publication NO. CN110613102A, the cooked stinky mandarin fish of the embodiment 1 prepared by the disclosure has high sensory acceptance, white and shiny meat inside, compact and elastic fish meat, tender and smooth, bone and meat separated, obvious garlic clove shape, and complete meat block shape without softness. Compared with the embodiment 2, the embodiment 1 has a higher sensory acceptance, indicating that the de-fishy and freshness-preserving process of the disclosure has a significant effect on improving the taste, smell and color of the cooked stinky mandarin fish after processing. In summary, the cooked stinky mandarin fish prepared by the disclosure can better maintain the sensory quality of the stinky mandarin fish, and obtain a cooked stinky mandarin fish product with excellent flavor and quality.

13.13±1.34 and 9.04±1.22, respectively, which are increased by 121.79% and 52.73%, respectively, and the difference is statistically significant (P<0.05), which indicates that the processing technology of the disclosure can better retain the whiteness of the meat of cooked stinky mandarin fish.

Figure 2:
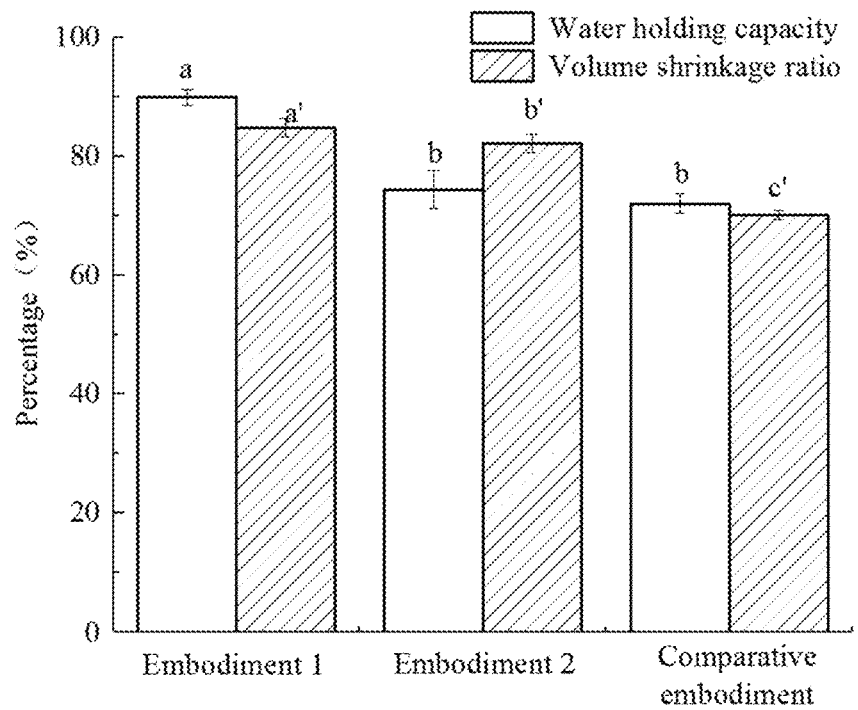
FIG. 2 illustrates a schematic diagram of water holding capacity and shrinkage ratios of the cooked stinky mandarin fish of the disclosure. Specifically, a, b, c, a', b', and c' represent statistically significant difference P<0.05.

The water holding capacity and shrinkage ratio of the cooked stinky mandarin fish product prepared according to the method of the disclosure are shown in FIG. 2

The water holding capacity refers to the ability of a sample to bind itself or external water. The greater the water holding capacity, the better the water retention of the sample. As shown in FIG. 2, the water holding capacity of the stinky mandarin fish samples in the comparative embodiment and the embodiment 2 is lower than that in the embodiment 1, and the water holding capacity of the stinky mandarin fish samples in the comparative embodiment and the embodiment 2 decreases significantly (P<0.05), which indicates that the processes of de-fishy and freshness-preserving, low-temperature air drying and frying for shaping, and mild heat treatment and sterilization in the disclosure have less damage to the muscle tissue and myofibril arrangement of the stinky mandarin fish, and can better retain the water holding capacity of the cooked stinky mandarin fish product, which is consistent with the moisture content results in Table 2.

TABLE 2

The moisture content and color results of the cooked stinky mandarin fish according to the disclosure

| Processing method | Moisture content (%) | Brightness L* | Redness and greenness a* | Yellowness and blueness b* | Whiteness |
|---|---|---|---|---|---|
| Embodiment 1 | 62.29 ± 0.95$^a$ | 13.90 ± 1.40$^a$ | 7.80 ± 0.20$^a$ | 8.47 ± 1.16$^a$ | 13.13 ± 1.34$^a$ |
| Embodiment 2 | 54.46 ± 0.95$^b$ | 9.53 ± 1.22$^b$ | 6.90 ± 0.20$^b$ | 6.47 ± 0.06$^b$ | 9.04 ± 1.22$^b$ |
| Comparative embodiment | 52.67 ± 0.81$^b$ | 6.37 ± 0.86$^c$ | 6.30 ± 0.72$^b$ | 6.63 ± 0.31$^b$ | 5.92 ± 0.92$^c$ |

Note:
$^a$, $^b$, and $^c$ represent statistically significant difference P < 0.05.

Note: a, b, and c represent statistically significant difference P<0.05.

The moisture content and the color are important sensory attributes of the cooked stinky mandarin fish, which affect the quality of the product. As shown in Table 2, the moisture contents of the embodiment 1, the embodiment 2 and the comparative embodiment are (62.29±0.95) %, (54.46±0.95) %, and (52.67±0.81) %, respectively. Compared with the embodiment 2 and the comparative embodiment, the moisture content of the embodiment 1 is increased by 7.82% and 9.62%, respectively. As shown in Table 2, the processing technology of the disclosure has a significant effect on the L* value, a* value, b* value and whiteness of the stinky mandarin fish. The L* value, a* value and b* value of the cooked stinky mandarin fish after the processing of the disclosure are increased compared with the control group (i.e., the comparative embodiment), and there is a statistical difference (P<0.05). Compared with the whiteness of 5.92±0.92 of the comparative embodiment, the whiteness of the embodiment 1 and the embodiment 2 increased to The volume shrinkage ratio indicates the degree of change in the volume of stinky mandarin fish before and after ultrahigh pressure treatment, and is an important texture characteristic parameter. The closer the volume shrinkage ratio is to 100%, the smaller the change in the volume and appearance of the sample. As shown in FIG. 2, compared with the volume shrinkage ratio of the comparative embodiment of (70.09±0.77) %, the volume shrinkage ratios of the embodiment 1 and the embodiment 2 are increased to (82.14±1.55) % and (84.82±1.55) %, respectively, and there is a statistical difference (P<0.05). This may be due to the strong heat treatment of the comparative embodiment (121° C., 20-30 min), which causes the aggregation and denaturation of the myosin molecules of the stinky mandarin fish, resulting in the shrinkage of the fish meat and the reduction of its volume.

The hardness, elasticity, cohesiveness and chewiness of cooked stinky mandarin fish after different processing are compared. The results are shown in Table 3.

TABLE 3

Texture properties of cooked stinky mandarin fish of the disclosure

| Processing method | Hardness (N) | Elasticity (mm) | Elastic coefficient | Cohesiveness | Chewiness (N) |
|---|---|---|---|---|---|
| Embodiment 1 | 27.39 ± 1.32$^c$ | 3.71 ± 0.03$^a$ | 0.74 ± 0.01$^a$ | 0.37 ± 0.07$^b$ | 7.43 ± 0.93$^a$ |
| Embodiment 2 | 31.18 ± 1.25$^b$ | 2.69 ± 0.15$^b$ | 0.54 ± 0.03$^b$ | 0.46 ± 0.02$^{ab}$ | 7.63 ± 0.17$^a$ |

TABLE 3-continued

Texture properties of cooked stinky mandarin fish of the disclosure

| Processing method | Hardness (N) | Elasticity (mm) | Elastic coefficient | Cohesiveness | Chewiness (N) |
|---|---|---|---|---|---|
| Comparative embodiment | 36.21 ± 0.97$^a$ | 2.06 ± 0.13$^c$ | 0.41 ± 0.03$^c$ | 0.50 ± 0.01$^a$ | 7.52 ± 0.42$^a$ |

Note:
$^a$, $^b$, and $^c$ represent statistically significant difference P < 0.05.

Note: a, b, and c represent statistically significant difference P<0.05.

Compared with the comparative embodiment (36.21±0.97 N), the hardness of the embodiment 1 and the embodiment 2 is significantly reduced (P<0.05), which are 27.39±1.32 N and 31.18±1.25 N, respectively. The elastic coefficient of the fish meat in the embodiment 1 is as high as 0.74±0.01, which is increased by 80.24% and 37.81% respectively compared with the comparative embodiment (0.41±0.03) and the embodiment 2 (0.54±0.03), and there is a significant difference (P<0.05), which indicates that the processes of de-fishy and freshness-preserving, low-temperature air drying and low-temperature frying for shaping, and mild heat treatment and sterilization in the method of the disclosure have little damage to the muscle tissue and myofibril arrangement of the stinky mandarin fish, and can better retain the elasticity of the cooked stinky mandarin fish meat. The cohesiveness and chewiness results of the cooked stinky mandarin fish are consistent with the change rules of its hardness and elasticity. The above results show that the processing technology of the disclosure reduces the hardness of the cooked stinky mandarin fish meat, increases the elasticity, and is more in line with the taste and comfort of normal chewing by humans.

Figure 3:
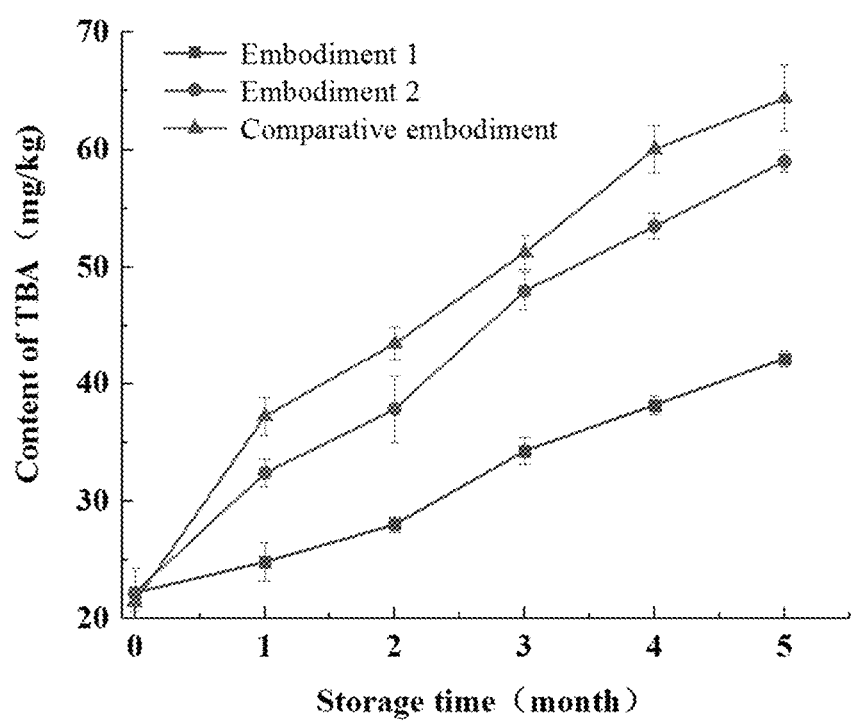
FIG. 3 illustrates a schematic diagram of change results of a content of TBA in the cooked stinky mandarin fish of the disclosure during storage.

TBA is an effective method for detecting oil oxidation products. It is widely used to determine the degree of fat oxidation and rancidity in meat and aquatic products, and is an important indicator for determining the degree of fat oxidation in fish meat. FIG. 3 illustrates the change results of the TBA content of the cooked stinky mandarin fish of the disclosure at 30° C. and a storage time of 0 to 5 months. The results show that with the extension of storage time, the TBA value of each group increases significantly, and the increase rates of the embodiment 1 and the embodiment 2 are lower than that of the comparative embodiment. In the fifth month of storage time, the TBA values of the embodiment 1, the embodiment 2 and the comparative embodiment are 30.12±0.47 mg/kg, 46.84±0.55 mg/kg, and 53.20±3.01 mg/kg, respectively, all within the acceptable range (less than 5 g/kg), but compared with the comparative embodiment, the TBA value of the embodiment 1 is significantly reduced by 43.39%. The above results show that the processing technology of the disclosure can effectively reduce the generation of TBA reactants during the storage of cooked stinky mandarin fish, and the added de-fishy and freshness-preserving ingredients have multiple functions such as de-fishy, freshness-preserving and anti-oxidation, thereby improving the safety and quality of cooked stinky mandarin fish during storage.

Table 4 shows the changes in total bacterial count and coliform group of the cooked stinky mandarin fish of the disclosure at 30° C., and a storage time of 0 to 5 months.

TABLE 4

Changes in total bacterial count and coliform group of the cooked stinky mandarin fish of the disclosure during storage

| Storage time (month) | Total bacterial count (colony-forming units per gram abbreviated as CFU/g) | | | Coliform group (CFU/g) | | |
|---|---|---|---|---|---|---|
| | Embodiment 1 | Embodiment 2 | Comparative embodiment | Embodiment 1 | Embodiment 2 | Comparative embodiment |
| 0 | 0 | 0 | 0 | 0 | 0 | 0 |
| 1 | 0 | 2.15 ± 0.21 | 0 | 0 | 0 | 0 |
| 2 | 1.00 ± 1.41 | 3.04 ± 0.06 | 2.00 ± 0.00 | 0 | 0 | 0 |
| 3 | 2.54 ± 0.09 | 3.37 ± 0.10 | 2.45 ± 0.21 | 0 | 1.50 ± 0.08 | 0 |
| 4 | 3.02 ± 0.03 | 3.95 ± 0.07 | 2.93 ± 0.04 | 0.15 ± 0.21 | 1.87 ± 0.04 | 0.24 ± 0.34 |
| 5 | 3.49 ± 0.02 | 5.30 ± 0.26 | 3.28 ± 0.03 | 1.00 ± 0.06 | 2.15 ± 0.04 | 0.93 ± 0.04 |

The total bacterial count and the coliform group are effective indicators for determining the degree of pollution level and sanitary quality of food. The national standard stipulates that when the total bacterial count in cooked fish exceeds 5 (log CFU/g) and the coliform group exceeds 2 (log CFU/g), the food is unsafe and cannot be eaten. It can be seen from Table 4 that the total bacterial count and coliform group of cooked stinky mandarin fish in different treatment groups increase with the extension of storage time, and the growth rate of the embodiment 2 is significantly higher than that of other treatment groups. In the fifth month of storage, the total colony count of the embodiment 2 reaches 5.30±0.26 (lgCFU/g) and the coliform group reaches 2.15±0.04 (lgCFU/g), exceeding the edible requirements specified in the national standard; while the total bacterial count and the coliform group in the cooked stinky mandarin fish after treatment in the embodiment 1 and the comparative embodiment increased slowly, with the total bacterial count being 3.49±0.02 and 3.28±0.03 (log CFU/g) in the fifth month, and the coliform group being 1.00±0.06 and 0.93±0.04 (log CFU/g) in the fifth month, with no significant difference (P>0.05), and both meeting the limits specified in the national standard. It can be seen that the soaking antimicrobic combined with mild heat treatment processing technology adopted by the disclosure has a good effect on killing microorganisms, and has the same sterilization effect as strong heat treatment (121° C., 20-30 min). In summary, the processing technology of the disclosure can not only significantly achieve a bactericidal effect, avoid adverse effects on the color, sensory quality, and texture characteristics of cooked stinky mandarin fish, but also effectively reduce the generation of TBA reactants during the storage of cooked stinky mandarin fish, have a dual effect of sterilization and antioxidant, and improve the safety and quality of stinky mandarin fish during the storage process.

The disclosure adopts a method of soaking antimicrobic combined with mild heat treatment sterilization, which has a good microbial killing effect, thereby ensuring food safety, prolonging the shelf-life, and largely avoiding adverse effects on the color, sensory quality, and texture characteristics of the cooked stinky mandarin fish. For example, the volume shrinkage ratio of the cooked stinky mandarin fish is reduced by 14.73%, the elasticity is increased by 80.24%, which significantly improves the processing quality of the cooked stinky mandarin fish.

The disclosure innovates the de-fishy and freshness-preserving preparation and process in the processing process, which can not only remove the fishy smell of the stinky mandarin fish, but also significantly reduce the water loss rate of the stinky mandarin fish in the processing process, such as a moisture content and water holding capacity of the product increased by 9.32% and 17.84%, respectively, and the generation of TBA reactants in the storage process of the cooked stinky mandarin fish is also effectively inhibited, such as the TBA content in the fifth month under the storage condition of 30° C. is significantly reduced by 43.39%, and the added de-fishy and freshness-preserving ingredients have multiple functions such as de-fishy, lock fresh and anti-oxidation, thereby improving the safety quality of the cooked stinky mandarin fish in the storage process.

The cooked stinky mandarin fish prepared by the disclosure has uniform quality, rich nutrition and full flavor. Compared with freshly cooked stinky mandarin fish dishes, there is no significant difference in color, fish meat texture, elasticity and garlic clove shape. It can be eaten after being heated in a microwave oven for 5 min or in a hot water bath for 5 min to 10 min. It is convenient and fast, and can be stored at the room temperature for 9 months, and has broad market application prospects. At the same time, the disclosure enriches the types of the stinky mandarin fish pre-prepared dishes, and meets the pursuit of modern people, especially people with fast-paced life, for safe, delicious, nutritious and convenient cooked stinky mandarin fish.

The matters not described in detail in the disclosure are all known technologies to those skilled in the art.

Finally, it should be noted that the above specific embodiments are merely used to illustrate the technical solution of the disclosure, rather than to limit it. Although the disclosure has been described in detail with reference to the embodiments, those skilled in the art should understand that the technical solution of the disclosure can be modified and replaced by equivalents without departing from the spirit and scope of the technical solution of the disclosure, which should be included in the scope of the claims of the disclosure.

What is claimed is:

1. A production method for room-temperature cooked stinky mandarin fish, comprising:
preliminarily processing a marinated stinky mandarin fish, followed by soaking in an antimicrobial solution, and soaking in a de-fishy and freshness-preserving solution, to obtain a soaked product, drying the soaked product to obtain a dried product, shaping the dried product to obtain a room-temperature cooked stinky mandarin fish product, and finally subpackaging the room-temperature cooked stinky mandarin fish product to obtain subpackaged products, and sterilizing the subpackaged products;
wherein the antimicrobial solution is a sodium hypochlorite solution, a power of hydrogen (pH) of the sodium hypochlorite solution is in a range of 6.5 to 7.5, an effective chlorine content of the sodium hypochlorite solution is in a range of 0.03 milligrams per milliliter (mg/mL) to 0.15 mg/mL, and a time of the soaking in an antimicrobial solution is in a range of 2 minutes (min) to 10 min;
the de-fishy and freshness-preserving solution comprises a plant composition, food-grade sodium lactate, food-grade cysteine, food-grade compound phosphate and water, and every 1 kilogram (kg) of the de-fishy and freshness-preserving solution comprises 5 grams (g) to 12 g of the plant composition, 0.001 g to 0.01 g of the food-grade sodium lactate, 0.001 g to 0.01 g of the food-grade cysteine, and 0.01 g to 1 g of the food-grade compound phosphate, with a remainder being the water; and a time of the soaking in a de-fishy and freshness-preserving solution is in a range of 5 min to 15 min;
a preparation method of the plant composition comprises: taking 5-15 parts by weight of dried perilla powder, 10-20 parts by weight of dried onion powder, 5-10 parts by weight of dried *Lithospermum erythrorhizon* powder, 5-10 parts by weight of dried *Angelica sinensis* powder and 125-300 parts by weight of distilled water as raw materials, stirring the raw materials to mix evenly to obtain a mixture, extracting from the mixture under conditions of a negative pressure intensity of −0.02 megapascals (MPa) to −0.08 MPa, a stirring speed of 100 revolutions per minute (rpm) to 150 rpm, a temperature of 30 Celsius degrees (° C.) to 55° C., and an extraction time of 0.5 hours (h) to 1 h to obtain an extracted solution, filtering and merging the extracted solution, followed by freeze-drying, to obtain the plant composition; and
the drying the soaked product to obtain a dried product comprises air drying in an oven, with a temperature controlled between 45° C. to 65° C., and a time controlled between 1 h to 4 h; and the shaping the dried product to obtain a room-temperature cooked stinky mandarin fish product comprises: frying the dried product in a vacuum fryer with a temperature of 60° C. to 85° C., a time of 30 seconds(s) to 120 s, and a vacuum degree of 60 kilopascals (kPa) to 85 kPa, to obtain a fried product, and taking out the fried product and draining oil from the fried product, wherein oil in the vacuum fryer is edible vegetable oil; and the sterilizing the subpackaged products comprises: placing the subpackaged products in a sterilization kettle for sterilization with a temperature of 85° C. to 105° C., a time of 5 min to 15 min, and a pressure of 0.2 MPa.

2. The production method for room-temperature cooked stinky mandarin fish as claimed in claim 1, wherein the marinated stinky mandarin fish requires no damage, air leakage or inflation in packaging, no dryness or softening phenomenon, fish meat having a natural white color, and having an odor after fermentation; and a moisture content of the marinated stinky mandarin fish is less than or equal to 80%, a chloride content of the marinated stinky mandarin fish is less than or equal to 2%, and an amino acid nitrogen content of the marinated stinky mandarin fish is greater than or equal to 600 milligrams per kilogram (mg/kg).

3. The production method for room-temperature cooked stinky mandarin fish as claimed in claim 1, wherein the preliminarily processing a marinated stinky mandarin fish comprises cleaning the marinated stinky mandarin fish until there are no blood stains or mucus on a surface of the marinated stinky mandarin fish to obtain a cleaned marinated stinky mandarin fish, and dicing the cleaned marinated stinky mandarin fish into fish pieces each with a length and a width of 1.5 centimeters (cm) to 2.5 cm.

4. The production method for room-temperature cooked stinky mandarin fish as claimed in claim 1, wherein the shaping the dried product to obtain a room-temperature cooked stinky mandarin fish product further comprises mixing and heating the room-temperature cooked stinky mandarin fish product and dish ingredients to obtain a cooked stinky mandarin fish dish.

5. The production method for room-temperature cooked stinky mandarin fish as claimed in claim 4, wherein the dish ingredients comprise: 30-50 parts by weight of dried bamboo shoots, 5-15 parts by weight of bell pepper, 5-15 parts by weight of onion, 5-15 parts by weight of fat meat, 5-10 parts by weight of mushroom, 2-5 parts by weight of black bean sauce, 2-3 parts by weight of oyster sauce, 1-2 parts by weight of soy sauce, 1-2 parts by weight of white sugar, 0.5-1 parts by weight of chicken essence, 0.3-1 parts by weight of vinegar, and 0.2-0.5 parts by weight of hydroxypropyl distarch phosphate; and chunks in the dish ingredients are diced into pieces with a particle size of 0.5 cm to 1.5 cm.

6. The production method for room-temperature cooked stinky mandarin fish as claimed in claim 4, wherein the mixing and heating the room-temperature cooked stinky mandarin fish product and dish ingredients to obtain a cooked stinky mandarin fish dish comprises pre-heating the dish ingredients to raise a temperature to 70° C. to 90° C. for 3 min to 5 min to obtain pre-heated dish ingredients, stopping heating, adding the room-temperature cooked stinky mandarin fish product, and mixing the pre-heated dish ingredients and the room-temperature cooked stinky mandarin fish product evenly.

7. The production method for room-temperature cooked stinky mandarin fish as claimed in claim 1, wherein the subpackaging the room-temperature cooked stinky mandarin fish product to obtain subpackaged products comprises cooling the room-temperature cooked stinky mandarin fish product to obtain a cooled product, and subpackaging the cooled product into vacuum bags, followed by vacuum sealing.

\* \* \* \* \*